Patented June 23, 1936

2,044,892

UNITED STATES PATENT OFFICE 2,044,892

CONDENSATION PRODUCTS OF KETONES WITH COMPOUNDS OF THE DIAMINO-ACRIDINIUM SERIES AND PROCESS OF PREPARING THEM

Otto Sievers, Frankfort-on-the-Main-Hochst, Germany, assignor to Winthrop Chemical Company, Inc., New York, N. Y., a corporation of New York No Drawing. Application February 21, 1934, Serial No. 712,434. In Germany March 4, 1933

16 Claims. (Cl. 260—36)

The present invention relates to condensation products of ketones with compounds of the diamino-acridinium series and to a process of preparing them.

I have found that 3.6-diamino-10-alkyl-acridinium compounds can be condensed with aliphatic, hydroaromatic or aliphatic-aromatic ketones in the presence of caustic alkalies so as to obtain new compounds. During the condensation only one of the two amino groups takes an active part in the reaction. There are produced nearly colorless compounds which crystallize well and have no bitter taste. They are insoluble in water and alkalies and soluble in ether, benzene and acetone. Their readily soluble salts of mineral acids which have a very weak yellow color yield, when diazotized, brown-yellow, very unstable diazo compounds, unlike the 3.6-diamino-alkyl-acridinium compounds themselves which, when diazotized, yield relatively stable dark violet diazo compounds.

The condensation which may be carried out in the presence of a solvent, such as water, alcohols, for instance methyl alcohol, ethyl alcohol, propyl alcohol, or a mixture of water and an alcohol, occurs already at ordinary temperature. The most suitable temperature is about 40° C. to about 60° C.

As ketones there may be used acetone, methyl-ethyl-ketone, diethyl-ketone, cyclohexanone, methyl-cyclohexanone, acetophenone, propiophenone, butyrophenone, tolyl-methyl-ketone. As caustic alkalies there may be used sodium-hydroxide, potassium-hydroxide and lithium-hydroxide.

The end point of the reaction can be recognized by the fact that the reaction mixture no longer yields the lilac to violet diazo reaction of the acridinium compounds used as starting material. The reaction is generally complete in about three hours.

The new compounds are intended for use for the manufacture of pharmaceutical preparations.

The course of the reaction cannot yet be explained with certainty.

The following examples serve to illustrate the invention, but they are not intended to limit it thereto:

1. A mixture of 3 liters of water, 1 liter of acetone and 200 cc. of caustic soda solution of specific gravity 1.530 is heated to 60° C. To this mixture there is caused to run, while stirring, a hot solution of 250 grams of 3.6-diamino-10-methyl-acridinium chloride in 1 liter of water. The clear solution soon becomes turbid and again clear, while brownish-yellow needles gradually precipitate. When recrystallized from ether or benzene they melt at 188° C. (uncorrected).

Instead of the methyl acridinium chloride there may be used ethyl-acridinium bromide for the preparation of the corresponding compound which possesses similar properties. Furthermore, there may be used, instead of acetone, methyl-ethyl-ketone or diethyl ketone whereby similar products are obtained.

2. Into a hot solution of 52 grams of acetophenone in 1 liter of ethyl alcohol to which have been added 200 cc. of caustic soda solution (specific gravity 1.530) there is gradually caused to run, while stirring, a hot solution of 52 grams of 3.6-diamino-10-methyl-acridinium chloride in 5 liters of water. The condensation product which precipitates in form of needles is filtered by suction and washed with water and a small quantity of alcohol. It melts at 175° C.

Similar products are obtained from propiophenone or butyrophenone.

3. 260 grams of acid 3,6-diamino-10-methyl acridinium sulfate are dissolved in 1.5 liters of hot water, 1 liter of methyl alcohol is added and the solution is rendered strongly alkaline with 150 cc. of a 10 N solution of caustic potash. After the addition of 100 grams of cyclohexanone the solution becomes decolorized within a short time and there is obtained a thick crystalline magma, which is filtered by suction, washed with water and methyl alcohol. Nearly colorless needles are thus obtained which melt at 236° C.

Similar products are obtained by using for the reaction other hydroaromatic cyclic ketones, such as methylcylohexanone or ethylcyclohezanone.

4. 1 liter of ethyl alcohol and 100 cc. of acetone are mixed with 200 cc. of caustic soda solution (specific gravity 1.530). The mixture is heated to 50° C. and mixed with a solution of 60 grams of 3,6-diamino-10-benzyl-acridinium chloride in 4 liters of water heated to 50° C. The precipiated condensation compound melts at 163° C.

In this case, too, similar compounds can be prepared with the aid of methyl-ethyl ketone, methyl-propyl ketone, diethyl ketone.

5. 100 grams of 2,7-dimethyl-3,6-diamino-10-methyl-acridinium chloride are dissolved in 5 liters of water. 200 cc. of acetone are caused to run into the solution, while stirring, and the clear solution is rendered strongly alkaline by the addition of 100 cc. of caustic soda solution of specific gravity 1.530. The precipitated yellow to brown needles are filtered by suction. They are soluble in dilute mineral acids and in most of the organic solvents, they are insoluble in water and alkalies. They do not melt below 300° C.

Instead of methyl acridinium chloride there may be used methyl acridinium carbonate, methyl acridinium bicarbonate, methyl acridinium nitrate, instead of the acetone there may be used methyl-ethyl-ketone, methyl-isobutyl-ketone for the preparation of corresponding compounds.

6. 100 grams of 3,6-diamino-10-methyl acridinium-lactate are dissolved in 250 cc. of water of 50° C. There are added 250 cc. of ethyl alcohol and 80 grams of acetyl-acetone. 250 cc. of caustic soda solution of specific gravity 1.530 are then caused to run into the solution, while stirring, and after ¼ hour the solution is diluted with cold water until the condensation product begins to precipitate. There are thus obtained brownish needles which are readily soluble in acetone and less readily soluble in benzene, chloroform, toluene. They are insoluble in water and dilute alkalies. They melt at 175° C.

Instead of acridinium-lactate there may also be used acridinium-tartrate, acridinium-oxalate, acridinium-glycollate, acridinium-formate, acridinium-acetate or acridinium-propionate for the preparation of the same compound.

I claim:

1. The process which comprises causing a compound of the following general formula:

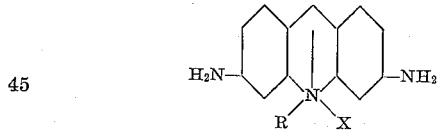

wherein R stands for alkyl or benzyl and X stands for the anion of a strong mineral acid or an aliphatic carboxylic acid which compound may be substituted by two alkyl groups in 2- and 7-position to act upon a ketone of the following general formula:

wherein $R_1$ and $R_2$ stand for alkyl, or $R_1$ stands for alkyl and $R_2$ for a radical of the benzene series, or $R_1$ and $R_2$ together stand for two carbon atoms of a hydrogenated six-membered hydrocarbon ring in the presence of caustic alkali.

2. The process which comprises causing a compound of the following general formula:

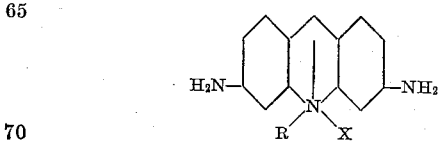

wherein R stands for alkyl or benzyl and X stands for the anion of a strong mineral acid or an aliphatic carboxylic acid, which compound may be substituted by two alkyl groups in 2- and 7-position to act upon a ketone of the following general formula:

wherein $R_1$ and $R_2$ stand for alkyl or $R_1$ stands for alkyl and $R_2$ for a radical of the benzene series, or $R_1$ and $R_2$ together stand for two carbon atoms of a hydrogenated six-membered hydrocarbon ring in the presence of caustic alkali and of an inert solvent.

3. The process which comprises causing a compound of the following general formula:

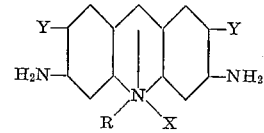

wherein R stands for alkyl or benzyl, X stands for the anion of a strong mineral acid or an aliphatic carboxylic acid, and both Y's stand for hydrogen or lower alkyl to act upon a ketone of the following general formula:

wherein $R_1$ and $R_2$ stand for alkyl, or $R_1$ stands for alkyl and $R_2$ for a radical of the benzene series, or $R_1$ and $R_2$ together stand for two carbon atoms of a hydrogenated six-membered hydrocarbon ring in the presence of caustic alkali.

4. The process which comprises causing a compound of the following general formula:

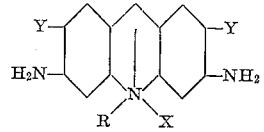

wherein R stands for alkyl or benzyl, X stands for the anion of a strong mineral acid or an aliphatic carboxylic acid, and both Y's stand for hydrogen or lower alkyl to act upon a ketone of the following general formula:

wherein $R_1$ and $R_2$ stand for alkyl, or $R_1$ stands for alkyl and $R_2$ for a radical of the benzene series, or $R_1$ and $R_2$ together stand for two carbon atoms of a hydrogenated six-membered hydrocarbon ring in the presence of caustic alkali and of an inert solvent.

5. The process which comprises causing a compound of the following general formula:

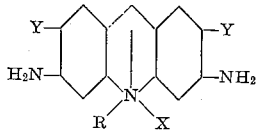

wherein R stands for alkyl or benzyl, X stands for the anion of a strong mineral acid, and both Y's stand for hydrogen or lower alkyl to act upon a ketone of the following general formula:

wherein $R_1$ and $R_2$ stand for alkyl, or $R_1$ stands for alkyl, and $R_2$ for a radical of the benzene series, or $R_1$ and $R_2$ together stand for two carbon atoms of a hydrogenated six-membered hydrocarbon ring in the presence of caustic alkali and of water.

6. The process which comprises causing a compound of the following general formula:

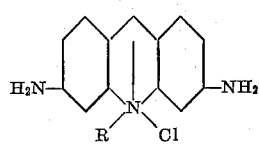

wherein R stands for alkyl or benzyl to act upon an aliphatic ketone in the presence of caustic alkali and of water.

7. The process which comprises causing a compound of the following general formula:

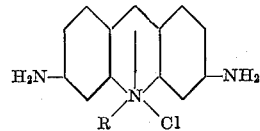

wherein R stands for alkyl or benzyl to act upon an aliphatic ketone in the presence of caustic alkali and of water at a temperature of about 40° C. to 60° C.

8. The process which comprises causing 3,6-diamino-10-methyl-acridinium-chloride to act upon acetone in the presence of sodium hydroxide and of water at a temperature of about 60° C.

9. The process which comprises causing 3,6-diamino-10-methyl-acridinium-sulfate to act upon cyclohexanone in the presence of potassium hydroxide, water and methyl alcohol at a temperature of about 40° C. to about 60° C.

10. The process which comprises causing 3,6-diamino-10-benzyl-acridinium-chloride to act upon acetone in the presence of sodium hydroxide, water and ethyl alcohol at a temperature of about 50° C.

11. The compounds obtainable by causing a compound of the following general formula:

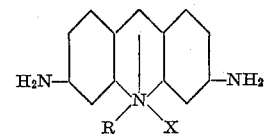

wherein R stands for alkyl or benzyl and X stands for the anion of a strong mineral acid or an aliphatic carboxylic acid which compound may be substituted by two alkyl groups in 2- and 7-position to act upon a ketone of the following general formula:

$R_1—CO—R_2$ wherein $R_1$ and $R_2$ stand for alkyl, or $R_1$ stands for alkyl and $R_2$ for a radical of the benzene series, or $R_1$ and $R_2$ together stand for two carbon atoms of a hydrogenated six-membered hydrocarbon ring in the presence of caustic alkali, said compounds being nearly colorless crystalline products, insoluble in water and aqueous alkalies, soluble in ether, benzene, acetone.

12. The compounds obtainable by causing a compound of the following general formula:

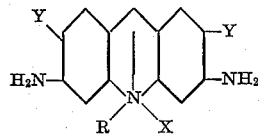

wherein R stands for alkyl or benzyl, X stands for the anion of a strong mineral acid and both Y's stand for hydrogen or lower alkyl, to act upon a ketone of the following general formula:

$R_1—CO—R_2$ wherein $R_1$ and $R_2$ stand for alkyl, or $R_1$ stands for alkyl and $R_2$ for a radical of the benzene series, or $R_1$ and $R_2$ together stand for two carbon atoms of a hydrogenated six-membered hydrocarbon ring in the presence of caustic alkali, said compounds being nearly colorless crystalline products, insoluble in water and aqueous alkalies, soluble in ether, benzene, acetone.

13. The compounds obtainable by causing a compound of the following general formula:

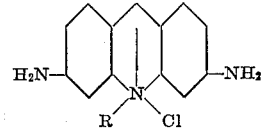

wherein R stands for alkyl or benzyl to act upon an aliphatic ketone in the presence of caustic alkali and of water, said compounds being nearly colorless, crystalline products, insoluble in water and aqueous alkalies, soluble in ether, benzene, acetone.

14. The compound obtainable by causing 3,6-diamino-10-methyl-acridinium-chloride to act upon acetone in the presence of sodium hydroxide and of water at a temperature of about 60° C., said compound forming brownish-yellow needles insoluble in water and aqueous alkalies, soluble in ether, benzene, acetone, melting at 188° C.

15. The compound obtainable by causing 3,6-diamino-10-methyl-acridinium-sulfate to act upon cyclohexanone in the presence of potassium hydroxide, water and methyl alcohol at a temperature of about 40° C. and about 60° C., said compound forming nearly colorless needles insoluble in water and aqueous alkalies, soluble in ether, benzene, acetone, melting at 236° C.

16. The compound obtainable by causing 3,6-diamino-10-benzyl-acridinium-chloride to act upon acetone in the presence of sodium hydroxide, water and ethyl alcohol at a temperature of about 50° C., said compound being a crystalline product, insoluble in water and aqueous alkalies, soluble in ether, benzene, acetone, melting at 163° C.

OTTO SIEVERS.